(12) United States Patent
Suzuki et al.

(10) Patent No.: US 6,256,120 B1
(45) Date of Patent: Jul. 3, 2001

(54) SPATIAL LIGHT MODULATION DEVICE AND COLOR DISPLAY APPARATUS

(75) Inventors: Tetsuji Suzuki; Shintaro Nakagaki; Shigeo Shimizu, all of Kanagawa-ken (JP)

(73) Assignee: Victor Company of Japan, Limited, Yokohama (JP)

( * ) Notice: Subject to any disclaimer, the term of this patent is extended or adjusted under 35 U.S.C. 154(b) by 0 days.

(21) Appl. No.: 09/290,745

(22) Filed: Apr. 13, 1999

(30) Foreign Application Priority Data

Apr. 23, 1998 (JP) .................................. 10-113895
Dec. 16, 1998 (JP) .................................. 10-358107

(51) Int. Cl.$^7$ .................................................. G02B 5/32
(52) U.S. Cl. .............................................. 359/15; 359/25
(58) Field of Search ................................ 359/15, 22, 25; 349/5, 62, 63, 95, 104, 106; 353/30, 31

(56) References Cited

U.S. PATENT DOCUMENTS

| | | | |
|---|---|---|---|
| 5,272,551 | 12/1993 | Lehureau et al. | 359/19 |
| 5,608,552 | 3/1997 | Smith | 349/5 |
| 5,737,040 | * 4/1998 | Ichikawa et al. | 359/15 |

FOREIGN PATENT DOCUMENTS

| | | |
|---|---|---|
| 0583150A1 | 2/1994 | (EP) . |
| 0777136A1 | 6/1997 | (EP) . |
| 0826986A1 | 3/1998 | (EP) . |
| P8-234202 | 9/1996 | (JP) . |
| P8-240717 | 9/1996 | (JP) . |
| P8-240868 | 9/1996 | (JP) . |
| P9-73014 | 3/1997 | (JP) . |
| P9-189809 | 7/1997 | (JP) . |

* cited by examiner

*Primary Examiner*—Darren Schuberg
(74) *Attorney, Agent, or Firm*—Nath & Associates PLLC; Harold L. Novick; Marvin C. Berkowitz (57) ABSTRACT

A color display apparatus includes a light source for emitting white light, a spectral unit for dispersing the white light into a red (R) light ray, a green (G) light ray, and a blue (B) light ray, and a spatial light modulation device. The spatial light modulation device includes a single hologram lens layer for diffracting and emitting incident light rays in predetermined directions depending on incident angles and wavelength bands and a liquid-crystal panel having a liquid-crystal layer for performing light modulation according to video signals of corresponding colors to light rays admitted through the hologram lens layer to emit the light rays, and color light components of an R light ray, a G light ray, and a B light ray admitted on the spatial light modulation device through the spectral unit are admitted on the hologram lens layer at different incident angles of the respective color light rays.

12 Claims, 9 Drawing Sheets

| | NO. | H[μm] | f[μm] | f/H | P[μm] | θ [deg] | E[%] | ΔXY | ESTIMATION |
|---|---|---|---|---|---|---|---|---|---|
| I | 1 | 30 | 39.8 | 1.33 | 0.471 | 25 | 33 | 0.097 | × |
| | 2 | 30 | 45 | 1.50 | 0.471 | 25 | 38 | 0.078 | △ |
| | 3 | 30 | 56.3 | 1.88 | 0.471 | 25 | 46 | 0.055 | ○ |
| | 4 | 30 | 62.3 | 2.08 | 0.471 | 25 | 48 | 0.041 | ○ |
| | 5 | 30 | 75.3 | 2.51 | 0.471 | 25 | 52 | 0.064 | △ |
| II | 1 | 30 | 39.8 | 1.33 | 0.416 | 30 | 35 | 0.096 | × |
| | 2 | 30 | 45 | 1.50 | 0.416 | 30 | 39 | 0.072 | △ |
| | 3 | 30 | 56.3 | 1.88 | 0.416 | 30 | 47 | 0.055 | ○ |
| | 4 | 30 | 62.3 | 2.08 | 0.416 | 30 | 52 | 0.032 | ○ |
| | 5 | 30 | 64.9 | 2.16 | 0.416 | 30 | 53 | 0.029 | ○ |
| | 6 | 30 | 75.3 | 2.51 | 0.416 | 30 | 55 | 0.055 | × |
| III | 1 | 30 | 39.8 | 1.33 | 0.384 | 35 | 32 | 0.093 | × |
| | 2 | 30 | 45 | 1.50 | 0.384 | 35 | 38 | 0.068 | △ |
| | 3 | 30 | 56.3 | 1.88 | 0.384 | 35 | 46 | 0.038 | ○ |
| | 4 | 30 | 62.3 | 2.08 | 0.384 | 35 | 52 | 0.148 | × |
| | 5 | 30 | 75.3 | 2.51 | 0.384 | 35 | 54 | 0.263 | × |

× : DEFECTIVE
△ : PROPER
○ : GOOD

FIG.10

SPATIAL LIGHT MODULATION DEVICE AND COLOR DISPLAY APPARATUS

BACKGROUND OF THE INVENTION

1. Field of the Invention

The present invention relates to a spatial light modulation device using a hologram lens layer and a color display apparatus using the spatial light modulation device.

2. Description of the Related Art

In a color display apparatus, color filters are necessary constituent elements. A conventional color filter is constituted by a resin layer which uses a pigment or dye as a coloring material and selectively transmit only one of the wavelength bands corresponding to R (red), G (green), and B (blue) which are the three primary colors of light. However, the conventional color filters corresponding RGB are formed in independent regions, respectively. A light ray which can be transmitted through the filter in each region is only one light ray of only one color of RGB in incident white light, and other light rays are absorbed by the filter. When a pixel size decreases, the filters of the color light rays are formed such that the filters partially overlap at boundary portions of the regions. For this reason, black stripes are generally formed on the boundary portions of adjacent regions to avoid color mixture. Therefore, a light transmittance of all the color filters is low, an efficiency of using light cannot be theoretically improved. The absorbed light rays are converted into heat, and the heat may be a factor in degrading display characteristics.

In contrast to this, in recent years, use of color filters (to be referred to as hologram color filters hereinafter) using hologram lenses is studied. According to the hologram color filters, by the diffraction and spectral functions of hologram lenses, white light can be diffracted and dispersed into three light components, i.e., RGB. Since use of such a hologram color filter can obtain a high efficiency of using light, the hologram color filter is effective to a projection type liquid-crystal display apparatus which requires improvement of an efficiency of using light.

Figure 1:
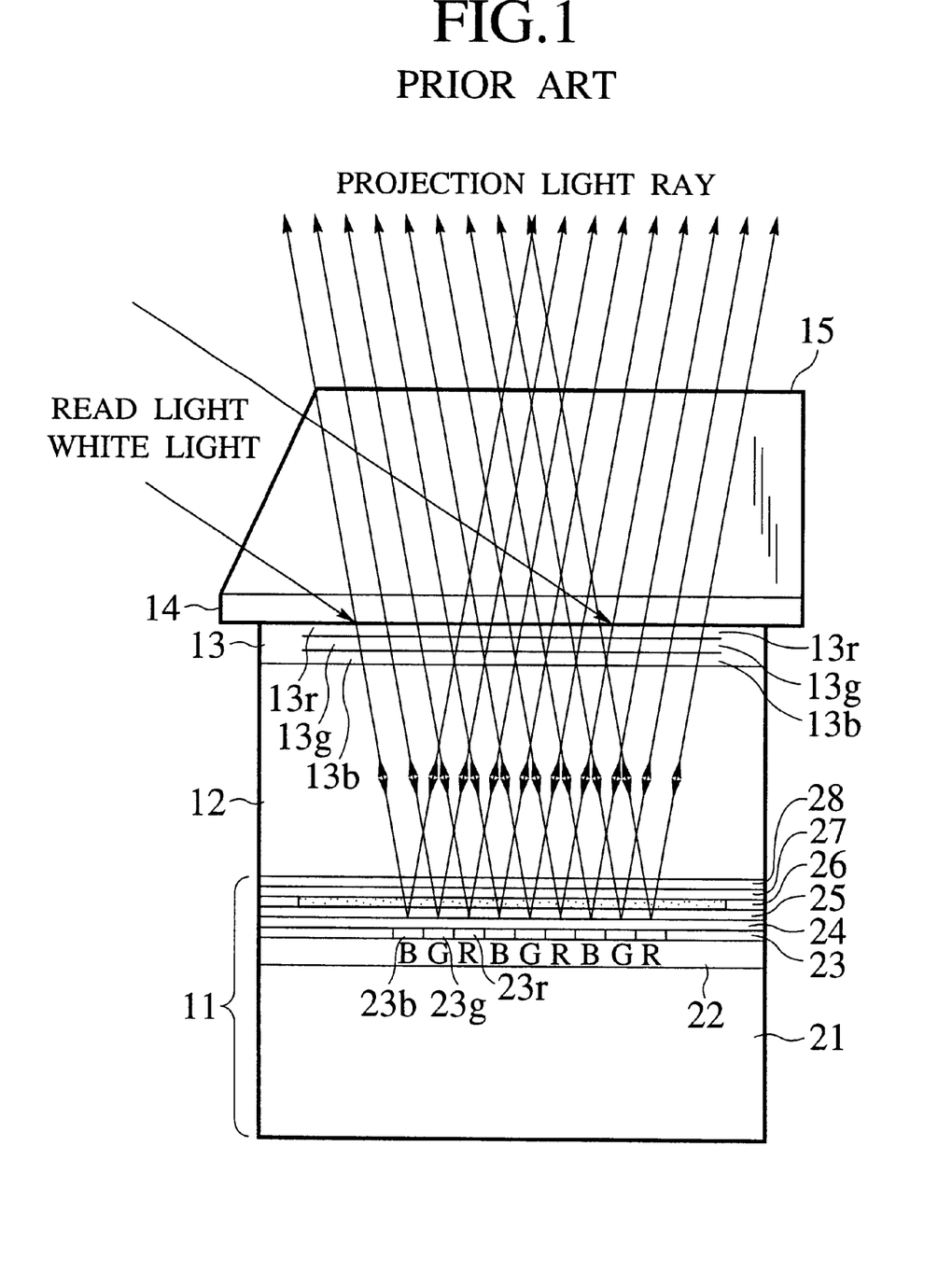
FIG. 1 is a device sectional view showing the arrangement of a conventional spatial light modulation device having a hologram color filter.

FIG. 1 is a device sectional view showing a typical structure of a spatial light modulation device in a projection type color liquid-crystal display apparatus having a reflection scheme disclosed in Publication of Patent Applications (Japanese Unexamined Patent Publication No. 9-189809) filed by the present applicant. In this spatial light modulation device, as a color filter, the hologram color filter described above is used as a color filter. In FIG. 1, reference numeral 11 denotes a liquid crystal panel; 12, a thin-plate glass layer; 13, a color filter; 14, a glass substrate; and 15, a coupling prism.

The liquid-crystal panel 11 has a structure in which a silicon substrate 21; an active matrix drive circuit 22 formed on the silicon substrate 21; a pixel electrode layer 23 obtained by regularly arraying pixel electrodes 23r, 23g, and 23b selectively controlled and driven by the active matrix drive circuit 22; a dielectric mirror film 24, an alignment film 25, a light modulation layer 26 having a liquid crystal sealed by a spacer; an alignment film 27; and a transparent common electrode layer 28 are sequentially laminated.

The color filter 13 is constituted by a so-called hologram lens array in which unit hologram lenses are regularly arrayed. The color filter 13 has a function of diffracting and dispersing read light (white light) including three primary colors, i.e., R, G, and B in units of color light rays to almost perpendicularly converge the light rays to the positions of the pixel electrodes 23r, 23g, and 23b corresponding to R, G, and B in the liquid-crystal panel 11. More specifically, main beams of beams are almost perpendicularly incident on the pixel electrodes 23r, 23g, and 23b, and the beams can be converged on the pixel electrodes 23r, 23g, and 23b by the lens functions thereof. Therefore, the projection type color liquid-crystal display apparatus using incident light without waste can be provided. As shown in FIG. 1, when the dielectric mirror film 24 is arranged on the pixel electrode layer 23, the destination of convergence is the dielectric mirror film 24.

Figure 2:
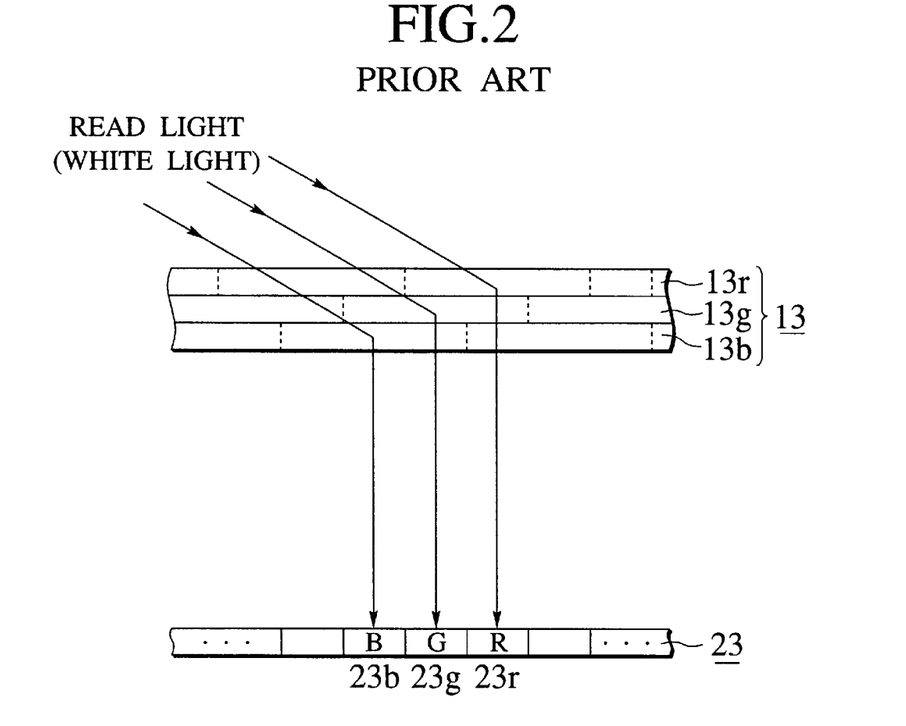
FIG. 2 is a diagram for explaining a photodissociation theory in a conventional spatial light modulation device.

FIG. 2 a diagram showing a color separation theory of read light (white light) of a hologram color filter in the spatial light modulation device shown in FIG. 1. As shown in FIG. 2, the color filter 13 has an arrangement in which a hologram color filter layer 13r for R, a hologram color filter layer 13g for G, and a hologram color filter layer 13b for b which correspond to the three primary colors, i.e., RGB are laminated. Of white light which is admitted on the color filter 13 at a predetermined angle, light rays having corresponding wavelengths are diffracted and dispersed by these layers, respectively.

For example, an R light component is diffracted and dispersed by the first layer 13r, a G light component is diffracted and dispersed by the second layer 13g, and a B light component is diffracted and dispersed by the third layer 13b. The R, G, and B light rays dispersed and diffracted by the layers are substantially converged on the corresponding pixel electrodes 23b, 23g, and 23r.

In this manner, a spatial light modulation device using conventional hologram lenses must comprise hologram lens layers corresponding to light colors of the three primary colors, i.e., RGB. More specifically, the hologram lens layers of a three-layer structure. Therefore, in the steps in manufacturing the hologram lens layers, hologram lens layers of three types must be manufactured. In addition, when the three layers are laminated, the positions of the three layers must be aligned with high precision such that light rays diffracted and dispersed by the hologram lens layers are converged on corresponding pixel electrodes, respectively.

For this reason, processes are cumbersome, process costs increase, and a high-definition color liquid-crystal display apparatus cannot be easily manufactured because of a problem in alignment precision.

SUMMARY OF THE INVENTION

It is an object of the present invention to provide a spatial light modulation device which can be manufactured by using simpler processes and a color display apparatus using the spatial light modulation device.

It is another object of the present invention to provide a spatial light modulation device which can be manufactured by using the simple processes and has a preferable efficiency of using light and preferable color reproducibility.

To achieve the objects described above, from the first aspect of the present invention, there is provided a spatial light modulation device comprising a single hologram lens layer which diffracts and emits incident light rays in predetermined directions depending on incident angles and wavelength bands, and a light modulation layer for performing light modulation according to video signals of corresponding colors to light rays admitted through the hologram lens layer to emit the light rays.

With this configuration, since the hologram lens layer diffracts and emits incident light rays in the predetermined directions depending on the incident angles and the wavelength bands, although the hologram lens layer is a single hologram lens layer, color light rays, i.e., an R light ray, a G light ray, and a B light ray can be resolved in predetermined directions. Since the hologram lens layer is constituted by a single layer, unlike a conventional hologram lens layer constituted by three layers, an alignment operation of the layers to be laminated is not necessary, manufacturing steps are considerably simplified, and process costs can be reduced.

Preferably, in the spatial light modulation device described above, the light modulation layer may be held between one transparent substrate on which a transparent electrode is formed and the other substrate on which pixel electrodes and a drive circuit layer are formed.

Preferably, in the spatial light modulation device, the pixel electrode may have a planar arrangement in which pixel electrodes for red, pixel electrodes for green, and pixel electrodes for blue are regularly and repeatedly arranged, and the pixel electrodes may be arranged such that wavelength dispersion of diffracted light rays emitted through the hologram lens layer and an array of the corresponding colors of the pixel electrodes have equal phases with respect to wavelengths.

When the pixel electrodes are arranged as described above, color light rays of the three primary colors, i.e., RGB diffracted through the hologram lens layer can be easily converged on the pixel electrodes of corresponding color light rays.

Preferably, in the spatial light modulation device, the hologram lens layer may have selectivity of diffraction efficiencies with respect to polarized light components such that, while a diffraction efficiency of one polarized wave of s-polarized and p-polarized waves of incident light is almost maximized, a diffraction efficiency of the other polarized wave is lowered.

In the hologram lens layer having the characteristics like this, for example, in a reflection type light modulation device, the s-polarized light component is diffracted and emitted by the hologram lens layer to be converged on the pixel electrodes and modulated by a light modulation layer on the way, and the returned p-polarized light component can be rarely diffracted and can be transmitted through the hologram lens layer. Therefore, a high efficiency of using light and a high contrast ratio can be obtained.

From the second aspect of the present invention, there is provided a color display apparatus comprising a light source for emitting white light, spectral means for dispersing the white light into color light components of a red (R) light ray, a green (G) light ray, and a blue (B) light ray, and a spatial light modulation device, wherein the spatial light modulation device has a single hologram lens layer for diffracting and emitting incident light rays in predetermined directions depending on incident angles and wavelength bands and a light modulation layer for performing light modulation according to video signals of corresponding colors to light rays admitted through the hologram lens layer to emit the light rays, and color light components of an R light ray, a G light ray, and a B light ray admitted on the spatial light modulation device through the spectral means are admitted on the hologram lens layer at different incident angles of the respective color light rays.

With this configuration, since the R light ray, the G light ray, and the B light ray according to the three primary colors can be incident on the hologram lens layer at different incident angles, and since the hologram lens layer diffracts and emits the incident light rays in the predetermined directions depending on the incident angles and the wavelength bands, although the hologram lens is a single layer, the hologram lens can perform color resolution to resolve the light into the color light rays, i.e., the R light ray, the G light ray, and the B light ray. Since the hologram lens layer is constituted by a single layer, unlike a conventional hologram lens constituted by three layers, only one hologram lens layer may be manufactured, an alignment operation for layers in lamination is not necessary, and manufacturing steps are considerably simplified. Therefore, a color display apparatus having low costs as a whole can be provided.

In the color display apparatus, the spatial light modulation device may be used.

Preferably, in the color display apparatus, when the color light components of the R light ray, the G light ray, and the B light ray are admitted on the hologram lens layer, the absolute values of inclination angles of the incident R light ray, the incident G light ray, and the incident B light ray from a normal of the hologram lens layer surface may satisfy a relationship of R light ray >G light ray >B light ray.

The color display apparatus described above may further comprise a projection lens system and a projection surface on which light transmitting through the projection lens system is projected, wherein, of light rays diffracted by the hologram lens, admitted on the light modulation layer, modulated by the light modulation layer, reflected by the pixel electrodes, and admitted on the hologram lens layer again, a light ray transmitted through the hologram lens layer without diffracted again may be projected on the projection surface by the projection lens system.

In the spatial light modulation device, the single hologram lens layer is obtained by regularly arraying unit hologram lenses on a plane, a focal length of the unit hologram lens is represented by f (where, f is the value that is converted to an air length), and a center-to-center distance between adjacent unit hologram lenses is represented by H. In this case, if a ratio f/H of the focal length f to the distance H is not less than 1.5 and not more than 2.5, a high efficiency of using light and preferable color reproducibility can be obtained. In particular, when the f/H is set within the range with respect to the G light ray according to RGB, a high efficiency of using light and preferable color reproducibility can be reliably obtained.

Preferably, in the spatial light modulation device, the unit hologram lens may have a diffraction grating in which first layers and second layers having different refractive indexes are alternately arrayed, and a pitch p of the diffraction grating on a lens center surface may be not less than 0.38 μm and not more than 0.48 μm. In this manner, with respect to the incident R light ray, the incident G light ray, and the incident B light ray, incident conditions that the diffraction efficiency of the p-polarized wave can be lowered while the diffraction efficiency of the s-polarized wave is almost maximized is found. Therefore, when the spatial light modulation device is used as a reflection type light modulation device, the s-polarized light component is mainly diffracted and emitted by the hologram lens layer to be converged on the pixel electrodes and modulated by the light modulation layer on the way, and the p-polarized light component can be rarely diffracted and can be transmitted through the hologram lens layer. For this reason, a high efficiency of using light and a high contrast ratio can be obtained.

Preferably, in the spatial light modulation device, an inclination angle θ of the diffraction grating with respect to a normal of the surface of the unit hologram lens may be not less than 25° and not more than 35°. In this case, under the condition that the incident R light ray, the incident G light ray, and the incident B light ray are almost perpendicularly emitted, as described above, a condition that the diffraction efficiencies have selectivity with respect to polarized components can be derived.

DETAILED DESCRIPTION OF THE PREFERRED EMBODIMENTS (First Embodiment)

The first embodiment of the present invention will be described below with reference to the accompanying drawings.

Figure 3:
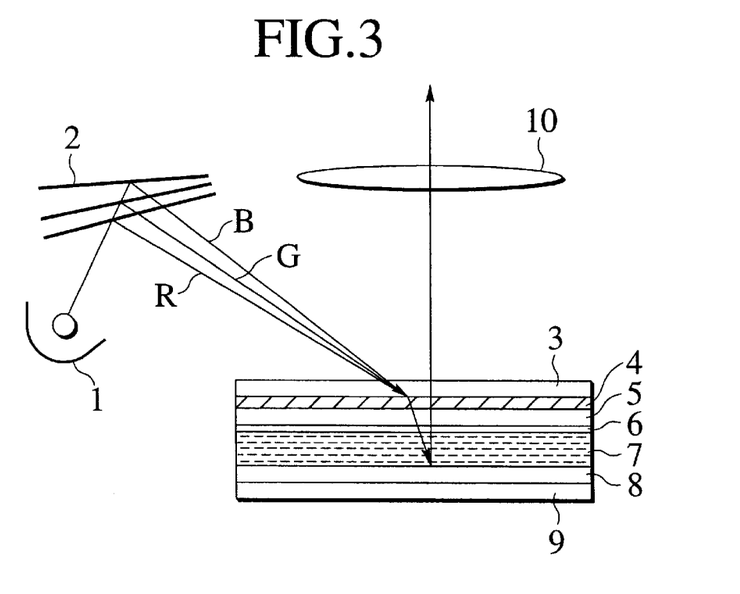
FIG. 3 is a diagram simply showing a color display apparatus according to the first embodiment of the present invention.

FIG. 3 is a diagram simply showing a projection type color display apparatus using a reflection type spatial light modulation device according to the embodiment of the present invention.

The spatial light modulation device according to this embodiment is different from the conventional spatial light modulation device shown in FIG. 1 in that a hologram lens layer 4 is constituted by a single layer. The arrangements except for the hologram lens layer 4 are the same as those in the conventional spatial light modulation device. More specifically, the spatial light modulation device in this embodiment has a structure in which a glass substrate 3, the hologram lens layer 4 serving as a single layer formed on the rear surface of the glass substrate 3, and a liquid-crystal panel are laminated from the upper side in FIG. 3. In addition, this liquid-crystal panel is constituted by a thin-plate glass layer 5, a transparent electrode 6 formed on the rear surface of the thin-plate glass layer 5, a liquid-crystal layer 7 serving as a light modulation layer, a pixel electrode 8 also serving as a light reflection surface, an active matrix drive circuit 9 for selectively controlling and driving the pixel electrode, and the like. The pixel electrode 8 and the active matrix drive circuit 9 are formed on a silicon substrate (not shown), and a liquid-crystal layer 7 is held by the silicon substrate and the thin-plate glass layer 5 described above. In FIG. 3, an alignment film, a dielectric film, and the like are omitted.

In the spatial light modulation device having the above arrangement, light admitted on the liquid-crystal layer 7 through the hologram lens layer 4 is modulated as needed, reflected by the surface of the pixel electrode 8, emitted from the spatial light modulation device through a path which is reverse to the incident direction, and enlarged by the projection lens 10 on the way to reach a screen (projection surface).

In the arrangement of the color display apparatus according to the embodiment, a dichroic mirror 2 which is not used in the arrangement of the conventional apparatus is added as a new constituent element. The dichroic mirror 2 is arranged between a light source 1 and the spatial light modulation device and has a function of dispersing white light emitted from the light source 1 into three RGB primary colors and converging the three RGB primary colors on an almost identical region on the hologram lens layer.

In the conventional color display apparatus, as shown in FIG. 2, light emitted from the light source is admitted on the hologram lens array layer as white beams having equal incident angles. In contrast to this, in the color display apparatus according to the embodiment, white light is dispersed into an R light ray, a G light ray, and a B light ray by the dichroic mirror 2, and these light rays are admitted on the hologram lens layer.

Figure 4:
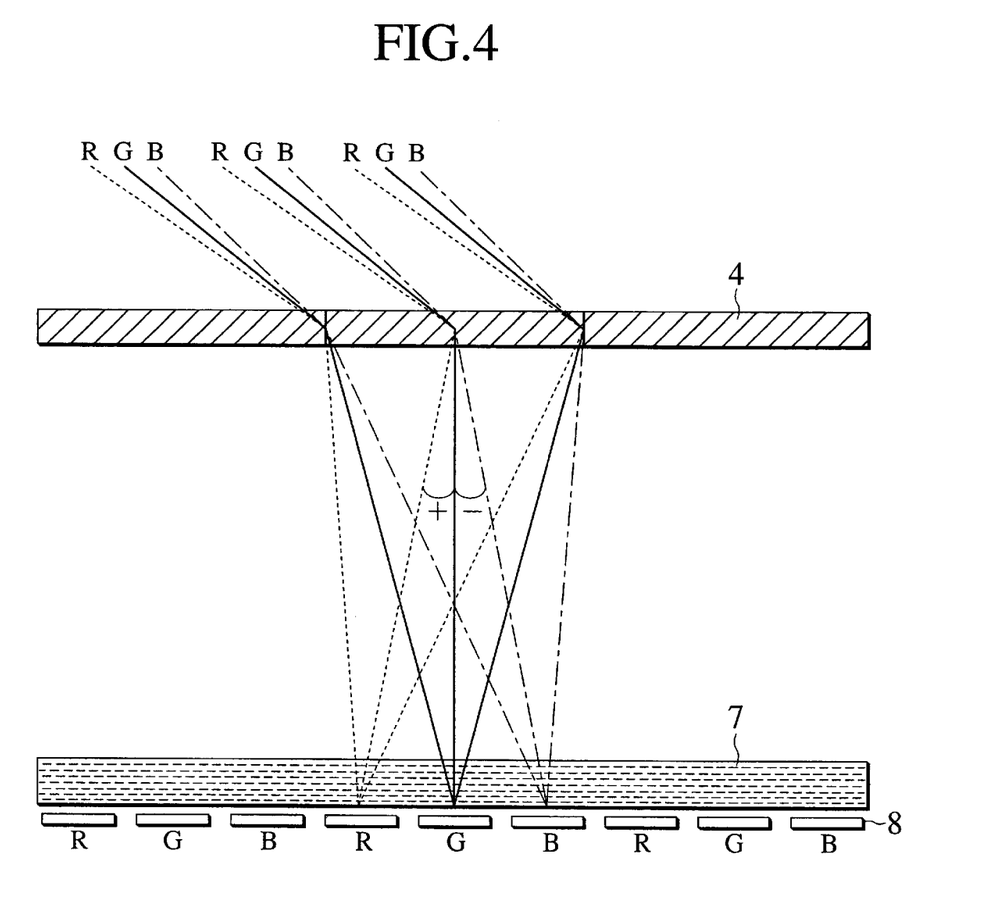
FIG. 4 is a diagram showing a photodissociation theory in the spatial light modulation device according to the first embodiment of the present invention.

FIG. 4 is a diagram showing a photodissociation theory in the spatial light modulation device according to the embodiment. For descriptive convenience, the arrangement of the spatial light modulation device, only the hologram lens layer 4, the liquid-crystal layer 7, and the pixel electrode 8 are shown in FIG. 4.

Light rays obtained such that light is dispersed into light rays of three RGB primary colors by the dichroic mirror 2 are admitted on an identical hologram lens unit region on the hologram lens layer 4. At this time, the light rays of the three RGB primary colors admitted on the hologram lens layer 4 are admitted on the hologram lens layer 4 at different angles depending on the color light rays.

According to the light diffraction characteristics of a general hologram lens, in a hologram lens designed such that a light ray admitted at an incident angle θ and having a specific wavelength λ is emitted at a diffraction angle of 0°, when the incident angle of the incident light ray is offset from θ, the diffraction angle also changes accordingly. The change in diffraction angle is also dependent on the wavelength of incident light ray. A light ray admitted at an angle smaller than the incident angle θ and having a wavelength shorter than the specific wavelength λ is emitted at a minus (−) diffraction angle, and a light ray admitted at a diffraction angle larger than the incident angle θ and having a wavelength longer than the specific wavelength ψ is emitted at a plus (+) diffraction angle.

More specifically, as shown in FIG. 4, when a light ray having the specific wavelength is defined as the G light ray, the B light ray having a wavelength shorter than that of the G light ray is emitted at a minus (−) diffraction angle, and the R light ray having a wavelength longer than that of the G light ray is emitted at a plus (+) diffraction angle. Therefore, as shown in FIG. 4, when pixel electrodes corresponding to the emission directions of the color light components are arranged, color separation for pixel electrodes required for color display can be performed.

A case wherein a hologram lens layer having a film thickness of 4.3 μm and Δn=0.045 and being designed such that a light ray admitted at an incident angle of 60°, i.e., the G light ray is emitted is used as the hologram lens layer 4 is employed as an example. Results obtained such that the relationships between the diffraction efficiencies of emitted light rays and incident angles are calculated are shown in FIG. 5A to FIG. 5C.

Note that Δn represents a difference between the refractive indexes of a high-refractive-index layer and a low-refractive-index layer constituting the hologram lens.

Figure 5A:
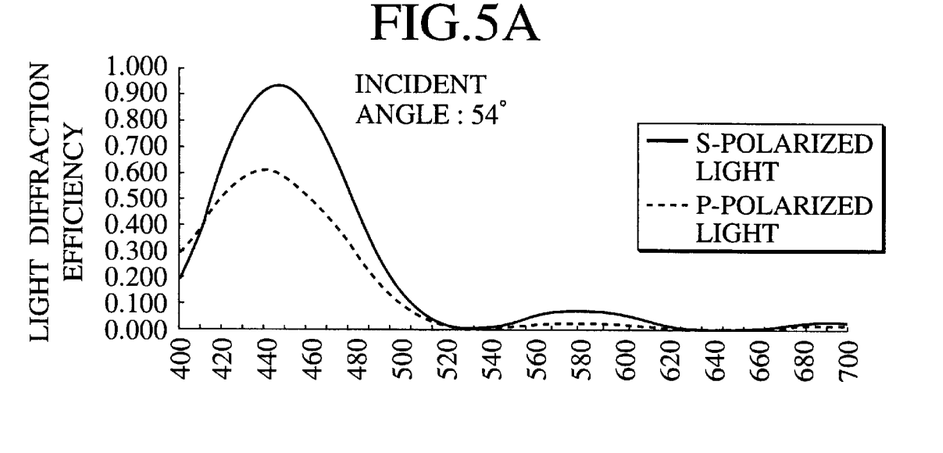
FIG. 5A to FIG. 5C are graphs showing wavelength dependencies of diffraction efficiencies on the incident angles of incident light rays in a hologram lens layer according to the first embodiment of the present invention.
Figure 5B:
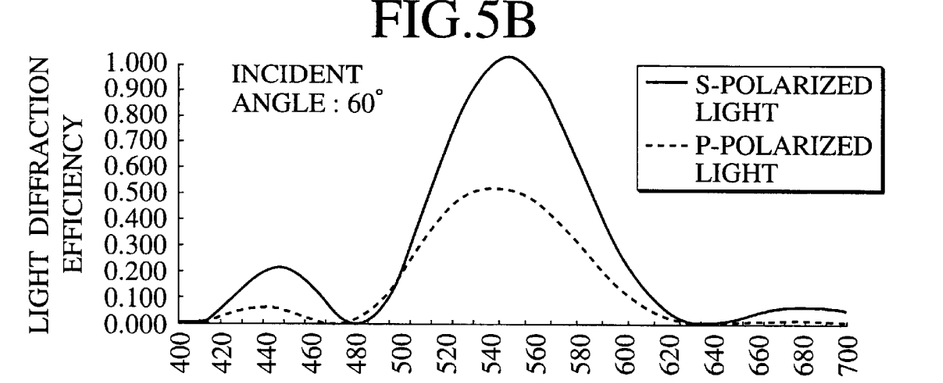
Figure 5C:
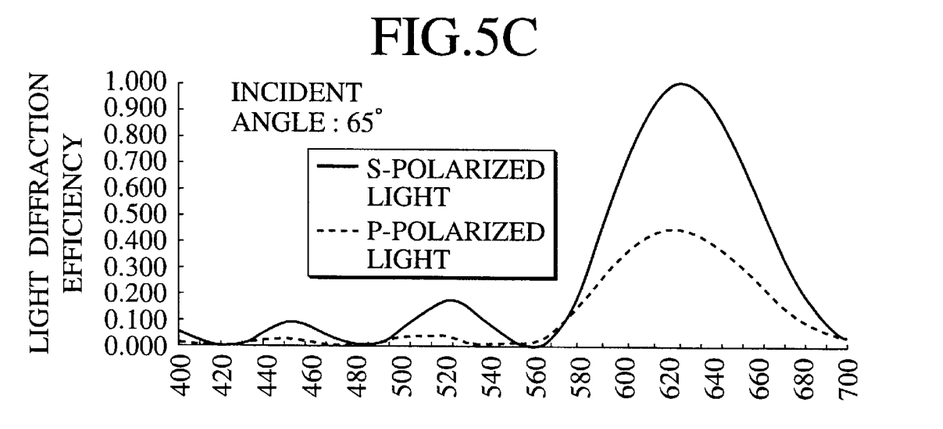

In each of FIG. 5A to FIG. 5C, an abscissa indicates a wavelength, and an ordinate indicates light diffraction efficiency. In each drawing, a value represented by a solid line indicates a case wherein an s-polarized light ray is used as an incident light ray, and a value represented by a broken line indicates a case wherein a p-polarized light ray is used as an incident light ray.

As shown in FIG. 5B, according to the design, the incident light ray admitted on the hologram lens layer at an incident angle of 60° exhibits the highest diffraction efficiency at a wavelength of about 545 nm which is the wavelength of the G light ray, and exhibits low diffraction efficiency with respect to a light ray in the other wavelength band.

In contrast to this, as shown in FIG. 5A, a light ray admitted on the same hologram lens layer at an incident angle of 54° exhibits the highest diffraction efficiency at a wavelength of about 450 nm which is the wavelength of the B light ray, and exhibits low diffraction efficiency with respect to a light ray in the other wavelength band. The B light ray diffracted at this time is emitted in a diffraction angle direction of about −5°.

As shown in FIG. 5C, a light ray admitted on the same hologram lens layer at an incident angle of 65° has the highest diffraction efficiency at a wavelength of about 640 nm which is the wavelength of the R light ray, and exhibits low diffraction efficiency with respect to a light ray in the other wavelength band. The R light ray diffracted at this time is emitted in a diffraction angle direction of about +6°.

Therefore, when the hologram lens layer having the design values is used, the incident angles of the R, G, and B light rays dispersed by the dichroic mirror 2 are set at 65°, 60°, and 54°, respectively. In this case, color light rays of RGB can be diffracted and emitted with the highest efficiency.

In addition, pixel electrodes of corresponding color light rays are arranged at predetermined positions in emission directions determined by the incident angles, color separation characteristics required for color separation can be obtained as in a case wherein a hologram color filter is constituted by a conventional three-layered structure. At this time, the phase of the wavelength dispersion of diffracted light rays and the phase of the array of the pixel electrodes of corresponding colors are just equal to each other in a wavelength.

For example, the width of the hologram lens unit is made equal to the total width of the three pixel electrodes corresponding to R, G, and B, and the width is set to be about 30 μm. In this case, a predetermined distance from the hologram lens center to the pixel electrode is set to be about 80 to 100 μm (where, this distance is the substantial value that is not converted to an air length).

As is apparent from the simulation results shown in FIGS. 5A to 5C, in the hologram lens layer designed as described above, when the RGB light rays are admitted at about 60°, the spolarized light ray can obtain diffraction efficiency which is higher than that of the p-polarized light ray. Therefore, when a polarizing plate (polarizer) which can extract the s-polarized light component is disposed out of the spatial light modulation device on a light incident side to use the s-polarized light ray as an incident light ray, a preferable efficiency of using light can be assured.

The hologram lens layer 4 is preferably designed such that, while the diffraction efficiency of the s-polarized light ray is almost maximized, the diffraction efficiency of the other p-polarized light ray is lowered, and the diffraction efficiency difference is 30% or more at an incident angle of 60°. When the diffraction efficiency has selectivity with respect to polarized components, the s-polarized light component in the read light is diffracted, converged on the pixel electrode 8, and modulated by the liquid-crystal layer 7, and the p-polarized light component to be returned is rarely diffracted, transmitted through the hologram lens layer 4, and used as projection light. For this reason, a high efficiency of using light and a high contrast ratio can be obtained.

As described above, the hologram lens layer used in the spatial light modulation device according to the embodiment is a single layer. However, the light is dispersed into RGB light rays by the dichroic mirror or the like in advance, and the color light rays are admitted on the hologram lens layer at predetermined incident angles, so that the light rays of corresponding colors can be converged on the predetermined pixel electrodes at a high efficiency of using light as in the case wherein a conventional hologram color filter constituted by a three-layered structure.

Since the hologram lens layer can be constituted by a single layer, although three hologram lens layers must be manufactured in a prior art, only one layer may be manufactured, and an alignment performed when the three hologram lens layers are laminated is not required. Therefore, the steps in manufacturing the spatial light modulation device can be considerably reduced.

(Second Embodiment)

According to the second embodiment, in the spatial light modulation device having a single hologram lens layer according to the first embodiment, conditions of a concrete spatial light modulation device which can assure a preferable efficiency of using light and preferable color reproducibility will be described below.

Figure 6:
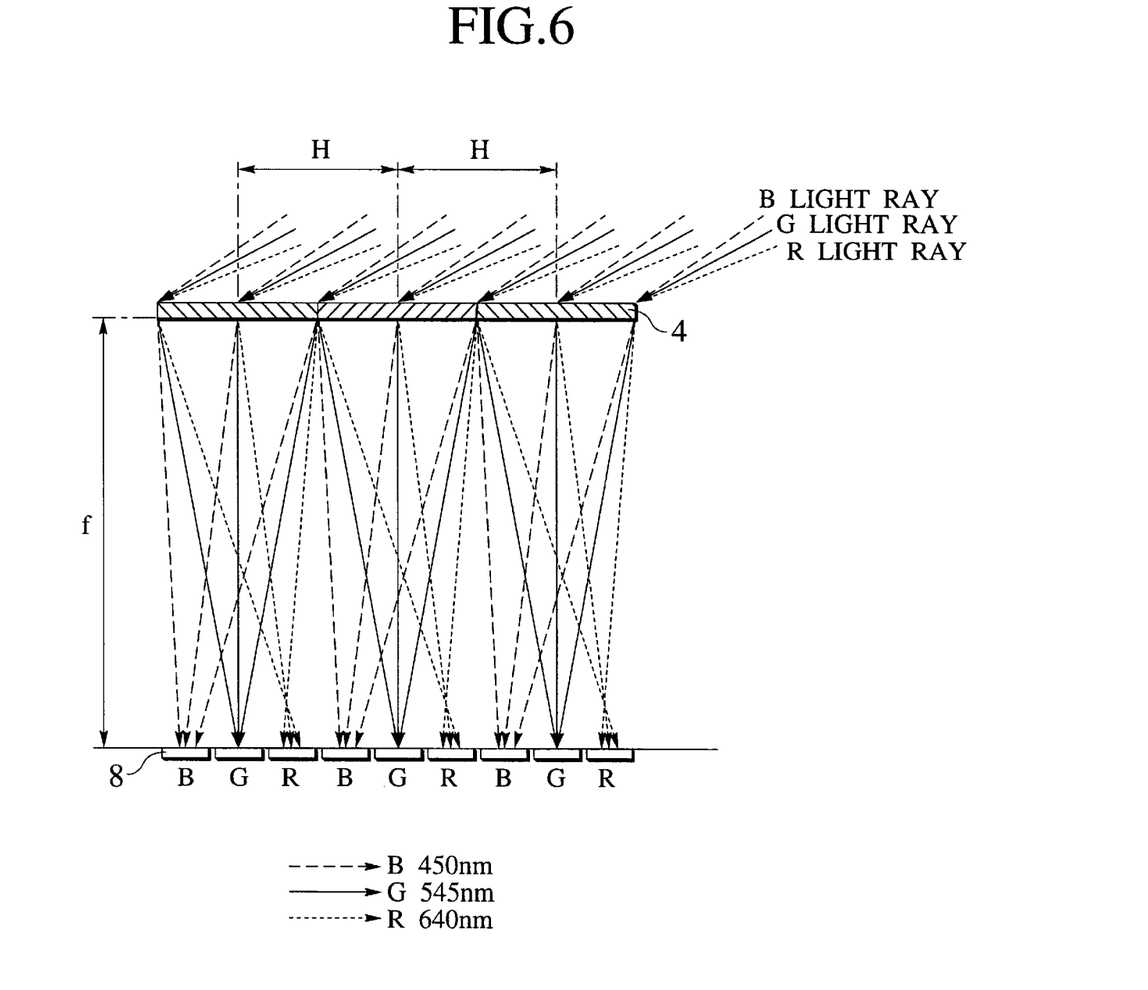
FIG. 6 is a diagram showing a photodissociation theory in the spatial light modulation device according to the second embodiment of the present invention.

FIG. 6 is a diagram showing a photodissociation theory in the spatial light modulation device according to the second embodiment. In this case, a liquid-crystal layer and the like are omitted for descriptive convenience, and only a hologram lens layer 4 and a pixel electrode 8 are shown in FIG. 6. In FIG, 6, light is admitted on the hologram lens layer 4 from the right side. Although the phase of the wave length dispersion is apparently horizontally reverse to that in the first embodiment, the basic photodissociation theory is the same as that in FIG. 4. More specifically, the absolute values of the inclination angles of the R light ray, the G light ray, and the B light ray serving as incident light rays from the normal of the surface of the hologram lens layer satisfy a condition, i.e., R light ray>G light ray>B light ray. The pixel electrodes are sequentially arranged from the left side, i.e., "B (blue), G (green), R (red), B, G, R. . . . " such that the phase of the array of the corresponding colors and the phase of the wavelength dispersion of the incident light rays are equal to each other.

In FIG. 4, the illustration is made such that the R, G, and B light rays can be converged on the corresponding pixel electrodes. However, in fact, when design is made such that the G light ray is just focused on a pixel electrode, the R light ray having a wavelength longer than that of the G light ray is focused with a shorter distance because the R light ray is more largely diffracted, and the B light ray is focused with a longer distance because the B light ray has a diffraction angle smaller than that of the G light ray. This manner is shown in FIG. 6.

Figure 7A:
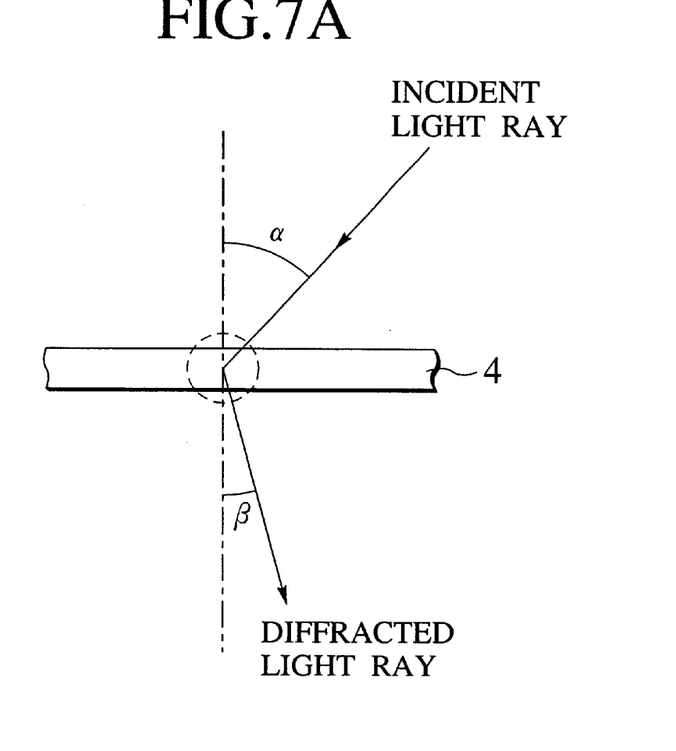
FIGS. 7A and 7B are partially enlarged diagrams of a lens center of a single hologram according to the second embodiment of the present invention.
Figure 7B:
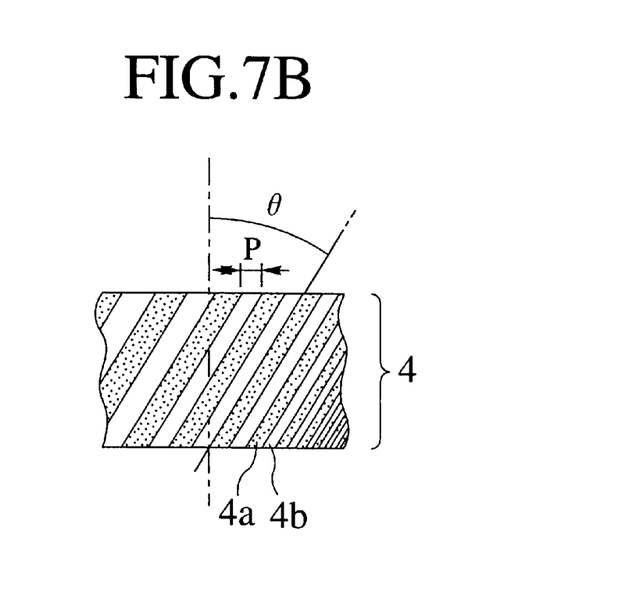

FIG. 7A is a partially enlarged diagram of a lens center of a single hologram used in the embodiment. FIG. 7B is an enlarged view showing the structure of the central portion of the hologram lens layer 4. FIG. 7B shows the structure such that a change amount of pitch is emphasized. As shown in FIG. 7B, the hologram lens layer 4 is constituted by a diffraction grating in which two types of resin layers 4a and 4b having different refractive indexes are alternately arranged.

As shown in FIGS. 7A and 7B, assume that the incident angle of an incident light ray is represented by a, the diffraction angle of a diffracted light ray is represented by $\beta$, a pitch on the lens surface of the diffraction grating is represented by p, an inclination angle of the diffraction grating is represented by $\theta$, and the wavelength of the incident light ray is represented by $\lambda$. In this case, in a so-called cubic hologram used here, the two following equations are generally established:

$$\sin \alpha + \sin \beta = \lambda/p \quad (1)$$

$$\theta = \alpha - (\alpha+\beta)/2 \quad (2)$$

Therefore, a light ray having a predetermined wavelength is to be diffracted, and various structural conditions of the hologram lens must be determined in consideration of the equations described above. For example, when the incident light rays having respective wavelengths are to be converged on pixel electrodes of the corresponding colors, a hologram lens having the pitch p and the inclination angle $\theta$ of the diffraction grating which satisfy the above equations must be constituted.

As has been described above in the first embodiment using FIGS. 5A to 5C, when the incident angles of the R, G, and B light rays are set to be 65°, 60°, and 54°, respectively, the R, G, and B light rays are diffracted and emitted at the highest efficiencies. Therefore, as shown in FIG. 3, it is preferable that light rays obtained by performing color separation such that the incident angles of the R light ray, the G light ray, and the B light ray become 65°, 60°, and 54° are admitted on the hologram lens layer 4 by using the dichroic mirror 2.

However, since a metal halide lamp generally used cannot serve as an ideal point light source, light rays admitted on the hologram lens through a lens system are not completely parallel light rays, and these light rays have conical range. This range is called a cone angle, and a range of ±5° with respect to a predetermined incident angle is formed.

For this reason, for example, the incident angle of the G light ray is designed to be 60°, the actual incident angle has a range of 55° to 65°. With respect to the R light ray and the B light ray, the incident angles have ranges which are almost equal to the range described above. As a result, the emitted light rays, i.e., the R light ray, the G light ray, and the B light ray are not completely converged on the pixel electrodes of the corresponding color light rays and reach adjacent pixel electrodes, and problems in color reproducibility may be posed.

When the distance in FIG. 6 between the center of a unit hologram lens and the center of an adjacent unit hologram lens is set to be a cycle H of the unit hologram lenses, and the focal length of the G light ray is represented by f (where, f is the value that is converted to an air length), the color reproducibility varies by changing the ratio "f/H of the focal length f to the cycle H. Although a liquid-crystal display apparatus requires a high efficiency of using light to obtain a brighter screen, the change of the value "f/H" influences the efficiency of using light.

More specifically, in order to obtain a spatial light modulation device having a preferable "efficiency of using light" and preferable "color reproducibility", it is preferable that structural conditions of the spatial light modulation device are calculated in consideration equation (1) and equation (2) described above, the "cycle H of the unit hologram lenses", the "focal length f of the G light ray", and the like.

Figure 9:
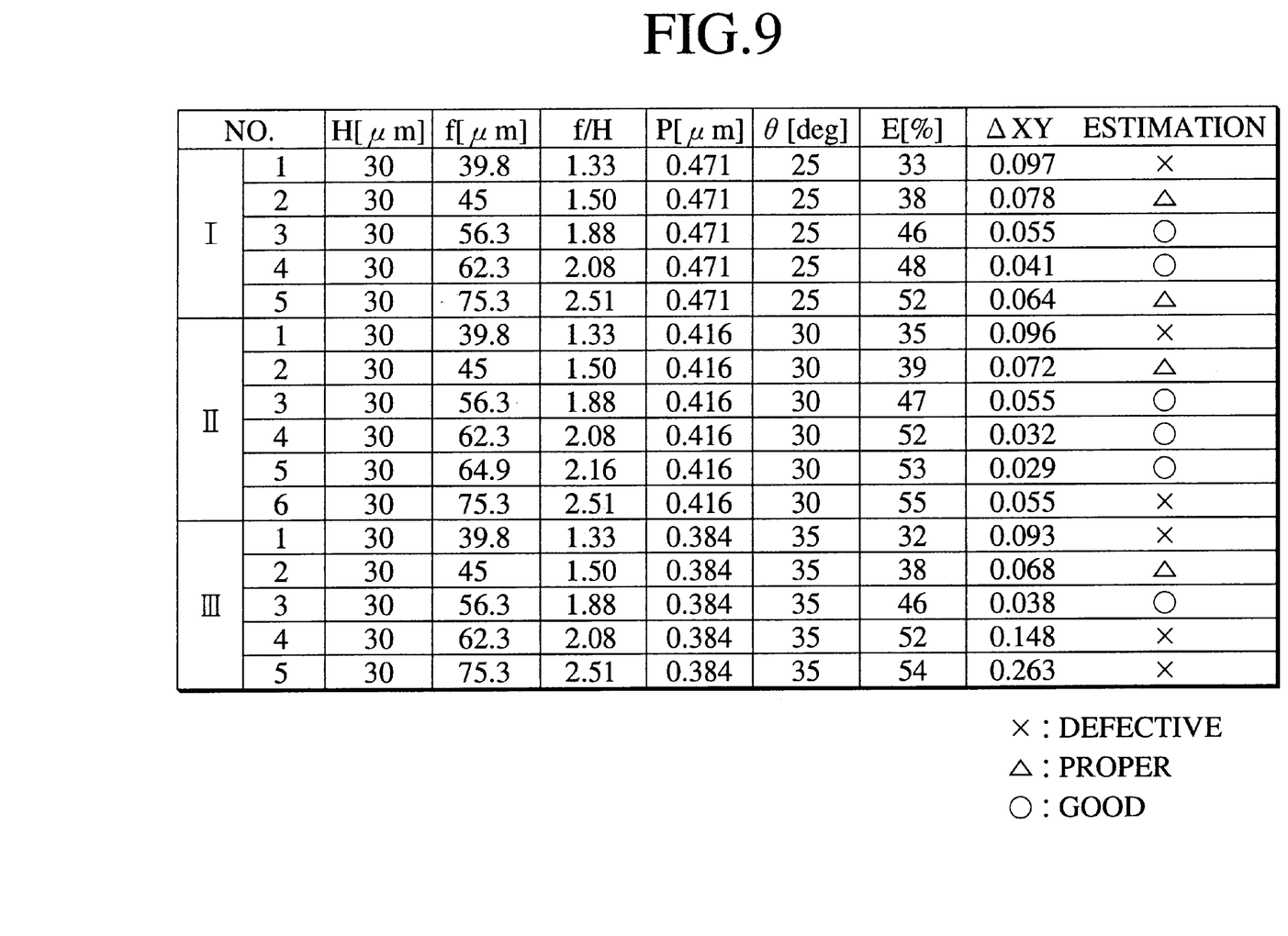
FIG. 9 is a table showing a simulation result according to the second embodiment of the present invention.

In the second embodiment, the pitch p on the lens surface of the diffraction grating, an inclination angle $\theta$ of the diffraction grating, the cycle H of the hologram lens, and the focal length f are set as parameters, and the conditions of the spatial light modulation device having a single hologram layer which can provide a preferable "efficiency of using light" and preferable "color reproducibility" by simulation are calculated. The results are shown in the table of FIG. 9 and the graph of FIG. 10.

Figure 8A:
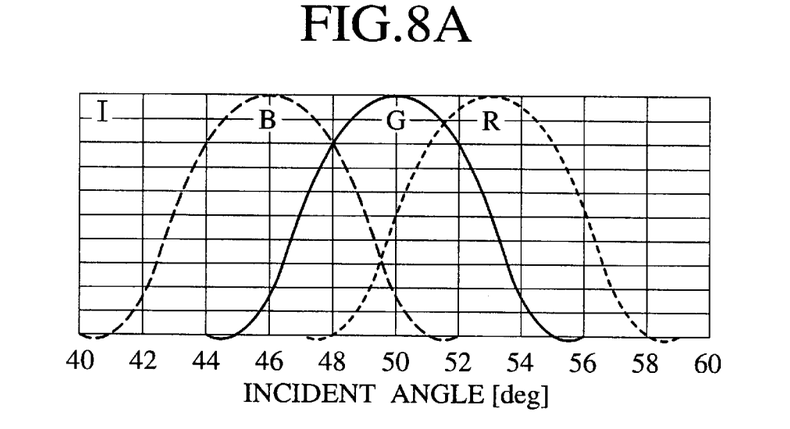
FIGS. 8A to 8C are graphs showing conditions of incident light rays used in simulation according to the second embodiment of the present invention.
Figure 8B:
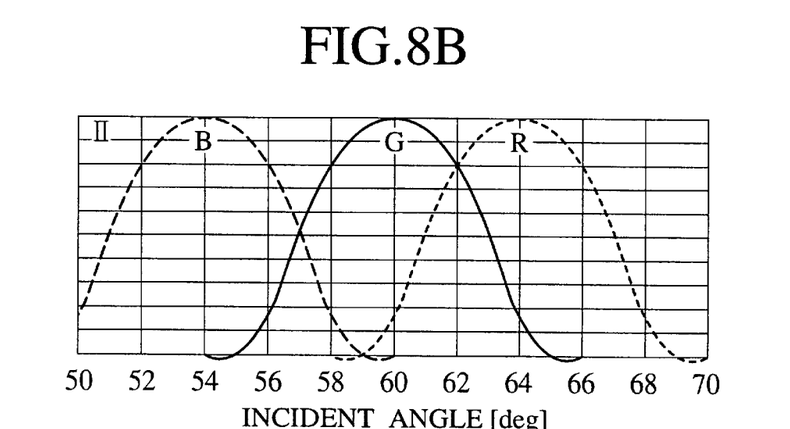
Figure 8C:
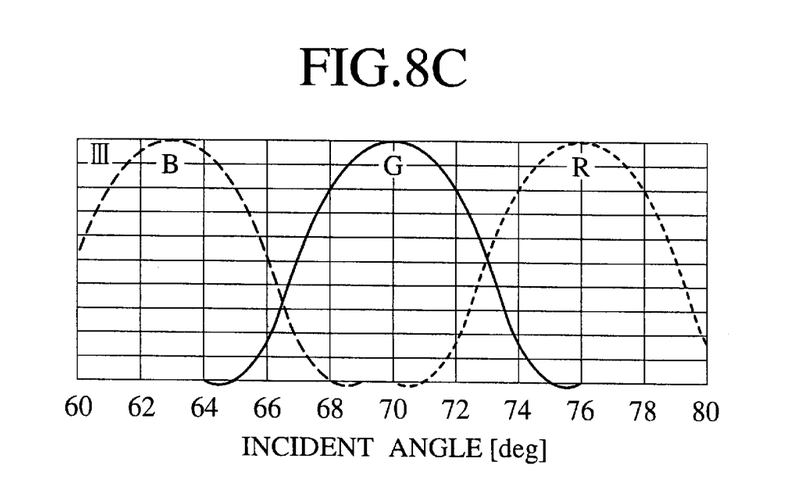

As the conditions of incident light rays used in simulation, three conditions, i.e., Condition I to Condition III shown in FIGS. 8A to 8C are used. In the graph shown in FIG. 10, the abscissa indicates an incident angle, and the ordinate indicates a normalized incident light intensity. Under Condition I, as shown in FIG. 8A, the design incident angle of the B light ray is 46°, the design incident angle of the G light ray is 50°, the design incident angle of the R light ray is 53°, and the cone angles of the color light rays range within ±5. Under Condition II, as shown in FIG. 8B, the design incident angle of the B light ray is 54°, the design incident angle of the G light ray is 60°, the design incident angle of the R light ray is 64°, and the cone angles of the color light rays range within ±5. In addition, under Condition III, as shown in FIG. 8C, the design incident angle of the B light ray is 63°, the design incident angle of the G light ray is 70°, the design incident angle of the R light ray is 76°, and the cone angles of the color light rays range within ±5.

In the embodiment, to make the manufacturing steps and the arrangement simple, as shown in FIG. 6, an arrangement in which a pixel pitch and the cycle H of the unit hologram lenses were equal to each other in size was employed, for example, the cycle H of the hologram lens was equal to the pixel pitch size, i.e., 30 $\mu$m, and simulation was performed. A refractive index difference An at this time was set to be 0.045, and the thickness of the hologram lens layer set to be 3.5 $\mu$m.

With respect to the G light ray, the condition that the diffraction angle at the unit hologram lens center is set to be 0° was selected. More specifically, the G light ray having an incident angle of 50° was diffracted and emitted at a diffraction angle of 0° at a corresponding unit hologram lens center in Condition I, the G light ray having an incident angle of 60° was diffracted and emitted at a diffraction angle of 0° at a corresponding unit hologram lens center in Condition II, and the G light ray having an incident angle of 70° was diffracted and emitted at a diffraction angle of 0° at a corresponding unit hologram lens center in Condition III.

In the table in FIG. 9, the pitch P of the diffraction grating and the inclination angle $\theta$ of the diffraction grating are values at the center of the unit hologram lens. In an actual spatial light modulation device, a glass layer and a liquid-crystal layer are arranged between the hologram lens layer and the pixel electrode, the focal length "f" shown in FIG. 9 is a numeral value obtained by air conversion. A symbol "E" denotes efficiency of using light calculated by simulation, and ΔXY denotes a "color reproducibility" calculated by simulation. As the color reproducibility, the value ΔXY obtained by reading an offset from an ideal chromaticity of the R light ray which is shortest of color reproducibility from chromaticity coordinates is shown in FIG. 9. On a side of the values of ΔXY, color reproducibilities are shown as levels on three stages, i.e., "good ○", "proper Δ", and "defective X" from a practical viewpoint.

Figure 10:
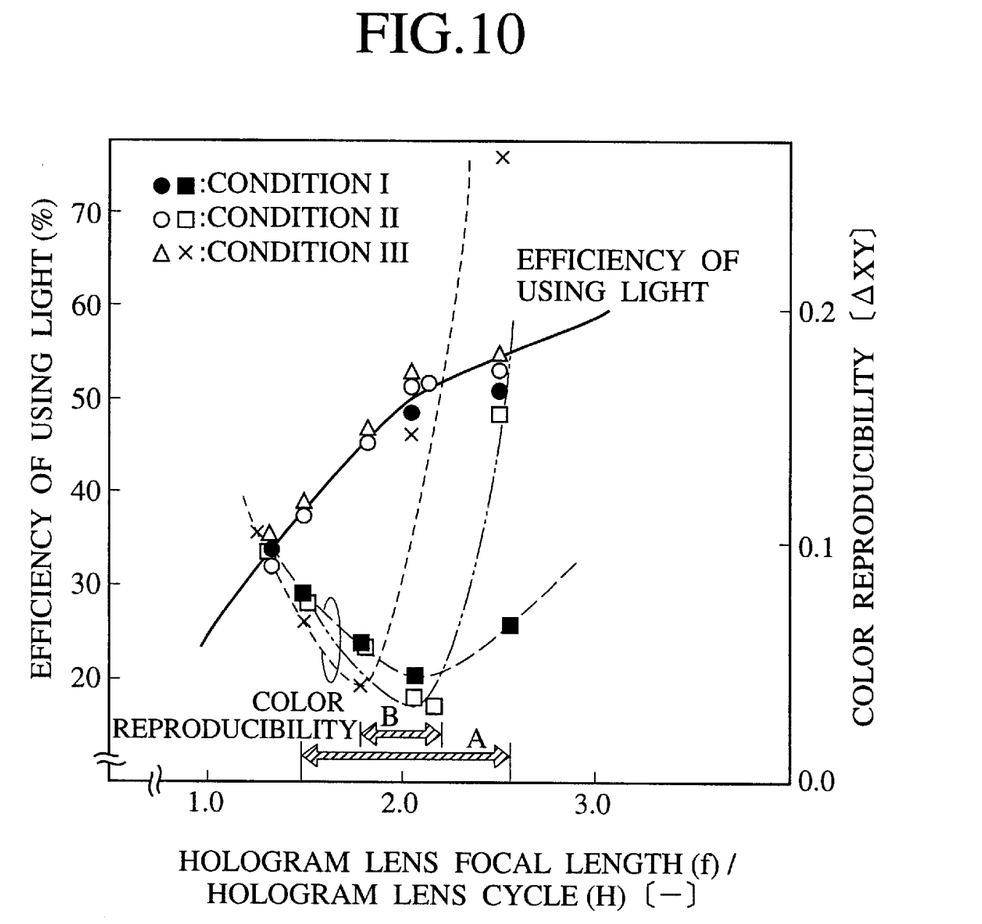
FIG. 10 is a graph showing a simulation result according to the second embodiment of the present invention.

In FIG. 10, of the results of the simulation shown in FIG. 9, the relationship between the ration "f/H" of the hologram lens focal length f to the hologram lens cycle H, the efficiency "E" of using light, and the color reproducibility "ΔXY" is plotted as a graph. The abscissa indicates "f/H", and the ordinate indicates "E" and "ΔXY". The results obtained from the simulation will be described below.

(About Color Reproducibility)

As shown in FIG. 10, the color reproducibility changes in V-shape to an increase of the value f/H. More specifically, the value of the color reproducibility temporarily decreases with an increase in f/H, but, thereafter, the value increases. The color reproducibility is preferable as the value ΔXY is small. In order to get the smallest value of ΔXY, the value f/H is about 2.1 under condition I, about 2.2 under condition II, and about 1.9 under condition III.

As shown in FIG. 10, when f/H is set within the range (range A in FIG. 10) of 1.5 to 2.5, a color reproducibility (ΔXY) of 0.08 or less which is regarded as a value which does not cause any problem can be obtained. In addition, preferably, when f/H is set within the range (range B in FIG. 10) of 1.8 to 2.2, a preferable color reproducibility (ΔXY) of 0.06 or less can be obtained.

When f/H is smaller than 1.5, a diffraction angle of the B light ray serving as an incident light ray is small with respect to an angle between the lens center and the pixel electrode corresponding to the B light ray. For this reason, the diffracted light ray of the B light ray sticks out to the adjacent pixel electrode corresponding to the G light ray, or the R light ray sticks out to the G pixel, so that color mixtures are easily caused. It is expected that the color mixtures degrade the color reproducibility.

When a light ray modulated by a pixel is finally projected at a large angle on a screen by a projection lens, the number of beams which cannot be picked by the projection lens increase, and substantial efficiency of using light is also considerably degraded. In addition, a metal halide lamp usedas a light source has spectral characteristics having high emission light intensity for the G light ray. However, most of light components whose diffraction angles become small when f/H decreases are the R light ray and the B light ray which originally tend to be short of light amounts. For this reason, the white balance of the R light ray, the G light ray, and the B light ray is more degraded.

On the other hand, when f/H is larger than 2.5, the diffraction angle of the G light ray is widened with respect to an angle between the lens center and the pixel electrode corresponding to the G light ray, and the G light ray easily sticks out onto an adjacent pixel electrode. Since an angle between the lens center and the B pixel is smaller than the diffraction angle of the B light ray, the diffracted light ray of the B light ray sticks out onto the adjacent pixel electrode, and color mixtures are easily caused. For this reason, color reproducibility is degraded.

(About Efficiency of Using Light)

The efficiency of using light E linearly increases as the numeral value f/H is increased. For example, when f/H is 2.0, the high efficiency of using light E which is 50% or more can be obtained. When f/H exceeds this value, the efficiency of using light E slightly moderately increase.

In the liquid-crystal display apparatus using conventional light-absorption type color filters, since filters are arranged in units of the RGB light rays, ⅓ of the incident light rays can be theoretically used at the most. When black stripes are formed around the pixels to prevent color mixtures of light rays, the efficiency of using light is degraded because the incident light rays are absorbed by the black stripe portions. The filters cannot transmit the corresponding color light rays at a transmittance of 100%. Therefore, the maximum efficiency of using light does not reach 30%.

In consideration of the case in which the conventional color filters are used is considered, as shown in FIG. 10, when f/H is set to be 1.33 in the embodiment, an efficiency of using light E of about 33% can be obtained, and an efficiency of using light which is sufficiently higher than that of the conventional color filters can be obtained. When the value of f/H is more increased, a higher efficiency of using light E can be obtained.

As described above, when f/H is set to be 1.5 or more and 2.5 or less, color reproducibility which does not cause any problem in practical use can be obtained. A sufficiently high efficiency of using light E can be obtained under the condition. (Other)

As shown in FIG. 8A to FIG. 8C, in the simulation, the incident angle of the G light ray is selected from 50°, 60°, and 70° as a condition. However, as described in the first embodiment, according to the studies which have been made by the present applicants, when the incident angle of the G light ray is set to be 50° or more and 70° or less, preferably, 60°, an s-wave diffraction efficiency which is higher than a pwave diffraction efficiency can be obtained. In this manner, when a spatial light modulation device having selectivity of diffraction efficiencies with respect to the types of polarized waves is used as a reflection type liquid-crystal display apparatus, an s-polarized light component in read light is diffracted, converged on the pixel electrode 8, and modulated by the liquid-crystal layer 7, and a p-polarized light component to be returned is rarely diffracted, transmitted through the hologram lens layer 4, and used as projection light. For this reason, a high efficiency of using light and a high contrast ratio can be obtained.

When the incident angle of the incident light ray exceeds 70°, light from the light source is admitted on a hologram lens at an angle which is almost horizontal, and the reflectance on the hologram lens surface increases. Illumination efficiency itself decreases, and the illumination efficiency is not suitable for practical use.

As described above, in order to obtain a high efficiency of using light and a high contrast ratio, the incident angle condition of the incident light ray is desirably set within a predetermined range. However, as derived from the above equations (1) and (2), the pitch P of the diffraction grating of the unit hologram lens and the inclination angle θ of the diffraction grating are set within a predetermined range, the incident angle condition can be defined.

For example, when the pitch of the diffraction grating at the center of the hologram lens is set to be about 0.42 μm, the incident angle of the G light ray can be set to be 60°. When the pitch of the diffraction grating is set to be about 0.38 μm, the incident angle can be set to be 70°. When the pitch of the diffraction grating of the unit hologram lens is set to be 0.38 μm or more and 0.42 μm or less as described above, the incident condition of an incident light ray which can obtain a high efficiency of using light and a high contrast ratio can be derived. When the inclination angles θ of the diffraction gratings at the unit hologram lens center are set to be 25° or more and 35° or less, the incident condition of an incident light ray which can obtain a high efficiency of using light and a high contrast ratio can also be derived.

Simulation results which are almost the same as the simulation results described above can also be obtained in a spatial light modulation device which is actually manufactured.

In this manner, a spatial light modulation device having a single hologram layer which is manufactured under the condition that f/H is set to be 1.5 or more and 2.5 or less is constituted by a simple structure and manufactured at low costs. Furthermore, the spatial light modulation device achieves a preferable light using rate and preferable color reproducibility. In addition, when aspatial light modulation device is manufactured under the condition that the pitch of the diffraction grating of the unit hologram lens is set to be 0.38 μm or more and 0.42 or less, or the condition that the inclination angles θ of the diffraction gratings at the unit hologram center is set to be 25° or more and 35° or less, higher efficiency of using light and a high contrast ratio can be obtained.

According to the studies of the present applicants, it is confirmed that the results obtained from the simulation described above are almost the same as in a spatial light modulation device which is actually manufactured.

Although the contents of the present invention have been described along the embodiments, the present invention is not limited to the embodiments. For example, although a reflection type spatial light modulation device is exemplified as the spatial light modulation device described above, the present invention can also be applied to a transmission type spatial light modulation device. As a means for dispersing light emitted from a light source into three RGB colors, a dichroic mirror is used in the above embodiments. However, the dichroic mirror can also be replaced with a hologram lens or the like. In addition, although a planar arrangement of pixel electrodes are not specifically illustrated, various arrangements such as a stripe type arrangement or a mosaic type arrangement which are generally used can also be employed. A pixel size or the like is not limited to the size used in the simulation.

What is claimed is:

1. A spatial light modulation device comprising:
   a single hologram lens layer which diffracts and emits incident light rays in predetermined directions depending on incident angles and wavelength bands, and a wavelength band which indicates a maximum diffraction efficiency depending on an incident angle of the incident light ray in the single hologram lens layer; and
   a light modulation layer for performing light modulation according to video signals of corresponding colors to light rays admitted through the hologram lens layer to emit the light rays;
   wherein the single hologram lens layer is obtained by regularly arraying unit hologram lenses on a plane,
   when a focal length of the unit hologram lens is represented by f, where f is the value that is converted in an air length, and a center-to-center distance between adjacent unit hologram lenses is represented by H, a ratio f/H of the focal length f to the distance H is not less than 1.5 and not more than 2.5.

2. A spatial light modulation device according to claim 1, wherein
   the light modulation layer is held between one transparent substrate on which a transparent electrode is formed and the other substrate on which pixel electrodes and a drive circuit layer are formed.

3. A spatial light modulation device according to claim 2, wherein
   the pixel electrode has a planar arrangement in which pixel electrodes for red, pixel electrodes for green, and pixel electrodes for blue are regularly and repeatedly arranged, and
   the pixel electrodes are arranged such that wavelength dispersion of diffracted light rays emitted through the hologram lens layer and an array of the corresponding colors of the pixel electrodes have equal phases with respect to wavelengths.

4. A spatial light modulation device according to claim 1, wherein
   the hologram lens layer has selectivity of diffraction efficiencies with respect to polarized light components such that, while a diffraction efficiency of one polarized wave of s-polarized and p-polarized waves of incident light is almost maximized, a diffraction efficiency of the other polarized wave is lowered.

5. A color display apparatus comprising:
   a light source for emitting white light;
   spectral means for dispersing the white light into color light components of a red (R) light ray, a green (G) light ray, and a blue (B) light ray; and
   a spatial light modulation device,
   wherein the spatial light modulation device has a single hologram lens layer for diffracting and emitting incident light rays in predetermined directions depending on incident angles and wavelength bands, and a wavelength band which indicates a maximum diffraction efficiency depending on an incident angle of the incident light ray in the single hologram lens layer, and a light modulation layer for performing light modulation according to video signals of corresponding colors to light rays admitted through the hologram lens layer to emit the light rays, and color light components of an R light ray, a G light ray, and a B light ray admitted on the spatial light modulation device through the spectral means are admitted on the hologram lens layer at different incident angles of the respective color light rays;
   wherein the single hologram lens layer is obtained by regularly arraying unit hologram lenses on a plane,
   when a focal length of the unit hologram lens is represented by f, where f is the value that is converted in an air length, and a center-to-center distance between adjacent unit hologram lenses is represented by H, a ratio f/H of the focal length f to the distance H is not less than 1.5 and not more than 2.5.

6. A color display apparatus according to claim 5, wherein the light modulation layer arranged in the spatial light modulation device is held between one transparent substrate on which a transparent electrode is formed and the other substrate on which pixel electrodes and a drive circuit layer are formed.

7. A color display apparatus according to claim 6, wherein
   the pixel electrode arranged in the spatial light modulation device has a planar arrangement in which pixel electrodes for red, pixel electrodes for green, and pixel electrodes for blue are regularly and repeatedly arranged, and
   the pixel electrodes are arranged such that wavelength dispersion of diffracted light rays emitted through the hologram lens layer and an array of the corresponding colors of the pixel electrodes have equal phases with respect to wavelengths.

8. A color display apparatus according to claim 5, wherein when the color light components of the R light ray, the G light ray, and the B light ray are admitted on the hologram lens layer, the absolute values of inclination angles of the incident R light ray, the incident G light ray, and the incident B light ray from a normal of the hologram lens layer surface satisfy a relationship of R light ray>G light ray>B light ray.

9. A color display apparatus according to claim 5, wherein the hologram lens layer arranged in the spatial light modulation device has selectivity of diffraction efficiencies with respect to polarized light components such that, while a diffraction efficiency of one polarized wave of s-polarized and p-polarized waves of incident light is almost maximized, a diffraction efficiency of the other polarized wave is lowered.

10. A color display apparatus according to claim 6, further comprising:

a projection lens system; and a projection surface on which light transmitting through the projection lens system is projected, wherein, of light rays diffracted by the hologram lens, admitted on the light modulation layer, modulated by the light modulation layer, reflected by the pixel electrodes, and admitted on the hologram lens layer again, a light ray transmitted through the hologram lens layer without diffracted again is projected on the projection surface by the projection lens system.

11. A spatial light modulation device according to claim 1, wherein the unit hologram lens is constituted by a diffraction grating in which first layers and second layers having different refractive indexes are alternately arrayed, and a pitch p of the diffraction grating on a lens center surface is not less than 0.38 $\mu$m and not more than 0.48 $\mu$m.

12. A spatial light modulation device according to claim 1, wherein an inclination angle $\theta$ of the diffraction grating with respect to a normal of the surface of the unit hologram lens is not less than 25° and not more than 35°.

* * * * *